United States Patent [19]

Laney

[11] 4,081,912
[45] Apr. 4, 1978

[54] MAGNETIC BEARING PLOTTING AND SIGHTING DEVICE

[76] Inventor: David F. Laney, 724 Hoover St., Norman, Okla. 73069

[21] Appl. No.: 809,537

[22] Filed: Jun. 24, 1977

[51] Int. Cl.$^2$ ............................................. G01C 17/12
[52] U.S. Cl. ....................................... 33/272; 33/262; 33/274; 33/355 R
[58] Field of Search ............. 33/272, 273, 274, 355 R, 33/262, 285, 281

[56] References Cited

U.S. PATENT DOCUMENTS

| 2,680,297 | 6/1954 | Vaucher | 33/272 |
| 2,822,618 | 2/1958 | Wendel | 33/273 |
| 3,184,854 | 5/1965 | Grasse | 33/272 |
| 3,191,306 | 6/1965 | Kierans | 33/273 |
| 3,373,429 | 3/1968 | Anderson | 33/274 |

FOREIGN PATENT DOCUMENTS

| 179,105 | 7/1954 | Austria | 33/272 |
| 365,749 | 12/1938 | Italy | 33/272 |

*Primary Examiner*—William D. Martin, Jr.
*Attorney, Agent, or Firm*—William R. Laney

[57] ABSTRACT

A device for taking and plotting magnetic bearings which includes an elongated straight edge device having numerical graduated indicia along one edge thereof, and a housing receiving said straight edge. A magnetic compass is mounted on the straight edge, and the housing includes folding portions adapted to enclose and protect the magnetic compass. A pair of sight pins are removably attachable to the compass and straight edge to provide a line of sight extending through the pivot point of the magnetized needle of the compass.

11 Claims, 3 Drawing Figures

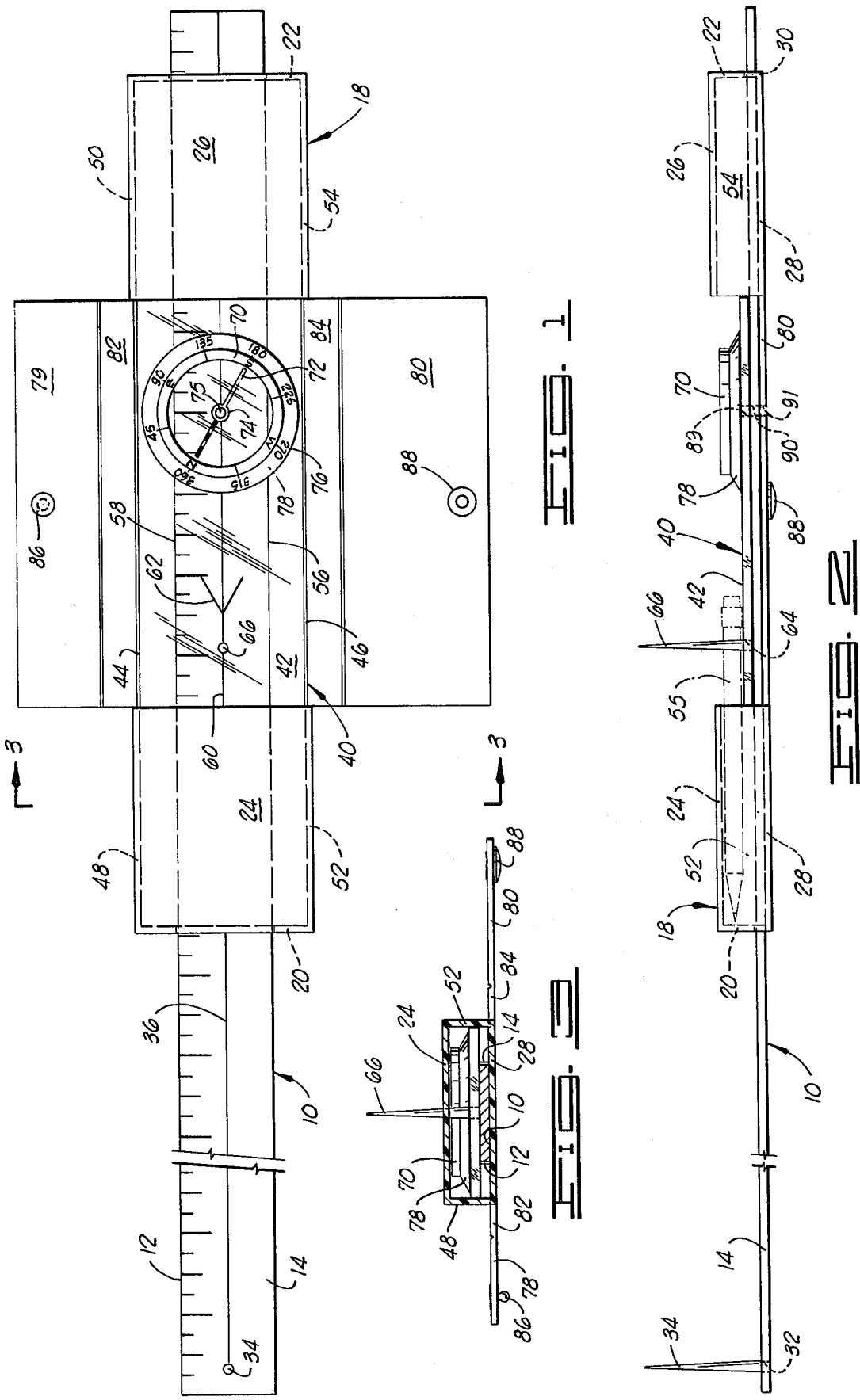

MAGNETIC BEARING PLOTTING AND SIGHTING DEVICE

BACKGROUND OF THE INVENTION

1. Field of the Invention

This invention relates to devices which can be used in the field for obtaining magnetic bearings of distant objects and plotting such bearings on a chart or map.

2. Brief Description of the Prior Art

Woodsmen and hikers frequently employ a magnetic compass for the purpose of determining their direction of travel in uncharted and unplotted areas. In other instances, it is desirable to be able to obtain an accurate line of sight from an observer to a distant object, with such line of sight being determined as a magnetic bearing from the observer to that object. In yet other instances, where charting or mapping is being carried out, it is desirable to be able to initially obtain a line of magnetic bearing from one point to another over the terrain being mapped, and to then transpose this magnetic bearing onto a chart or map which is being constructed.

For the purpose of accomplishing these objectives, some sophisticated and expensive instruments have heretofore been provided. On the other hand, for the occasional cartographer, or the person who is confronted with a need to make a chart in a rather expeditious manner and using inexpensive equipment, the only simple portable devices which have been previously available are a simple, pocket-type magnetic compass and a straight edge or ruler. It is frequently difficult with small portable compasses which have been heretofore available to obtain an accurate magnetic line of sight from the observer to a distant object. This is in part due to the difficulty of eliminating parallax during the sighting, and in part to the instability of the platform or rest upon which the compass is supported during the sighting. On some occasions, the compass is merely held in the hand, and the observer can only approximate the magnetic line of sight.

Brief Description of the Present Invention

The present invention provides a magnetic bearing plotting and sighting device which can be used to obtain a very accurate line of sight between an observer and a distant object, can be further used to establish correlation between this line of sight and a magnetic north-south line in terms of a magnetic bearing to the object, and finally, can be employed for the purpose of placing this magnetic line of sight or bearing upon a chart or map under construction.

Broadly described, the magnetic bearing plotting and sighting device of the invention comprises an elongated straight edge device in the form of a strip or band of rectangular configuration, which straight edge device has numerical graduated indicia along one side thereof, and a housing in which this straight edge is received and partially housed. A magnetic compass is mounted on the straight edge at about the central portion thereof, and the housing includes folding portions or flaps which are adapted to enclose and protect the magnetic compass when the device is not in use. A pair of sight pins are removably attachable to the compass and to the straight edge to provide a line of sight extending through the pivot point of the magnetized needle of the compass.

An important object of the present invention is to provide a novel magnetic bearing plotting and sighting device which can be rested upon a flat surface while an accurate line of sight is established between an observer and a distant object, and such line of sight then read from the device as a magnetic bearing.

A further object of the invention is to provide a portable, lightweight device which can be used for obtaining magnetic bearings in the field.

A further object of the invention is to provide a magnetic bearing plotting and sighting device which can be dually used for obtaining magnetic bearings and lines of sight, and for plotting these upon a chart or map.

An additional object of the invention is to provide a magnetic bearing plotting and sighting device which includes a sighting mechanism, and a magnetic compass associated with a housing which is adapted to be closed to protect the compass from the elements, and to provide a compact assembly which can be carried on the person of the user.

Additional objects and advantages of the invention will become apparent as the following detailed description of a preferred embodiment of the invention is read in conjunction with the accompanying drawings which illustrate the invention.

Broad Description of the Drawings

FIG. 1 is a plan view of the magnetic bearing plotting and sighting device of the present invention.

FIG. 2 is a side elevation view of the magnetic bearing plotting and sighting device of the invention.

FIG. 3 is a sectional view taken along line 3—3 of FIG. 1.

Detailed Description of a Preferred Embodiment of the Invention

The magnetic bearing plotting and sighting device of the invention includes an elongated, substantially monoplanar straight edge designated generally by reference numeral 10. The straight edge can take the form of a conventional ruler having parallel side edges 12 and 14 along which indicia are set forth to provide graduations indicative of linear measurement.

The straight edge is projected through the opposite end walls of a housing 18 of rectangular parallelepiped configuration. The housing end walls 20 and 22 extend between separated top walls 24 and 26 and an elongated continuous bottom wall 28. The straight edge 10 is supported upon the bottom wall 28 of the housing 18 and extends through slots 30 formed in the end walls 20 and 22 and dimensioned to snugly receive the straight edge.

At the end of the straight edge 10 which is remote from the housing 18, the straight edge has formed in the center thereof on its longitudinal axis, a pin-receiving aperture 32 in which a sight pin 34 is removably positioned. The sight pin 34 extends upwardly from the major plane of the straight edge 10 substantially normal to this plane. A line 36 is scribed on the upper surface of the straight edge 10 and is projected in coincidence with the longitudinal axis of the straight edge.

Secured to the upper side of the straight edge and between the opposite end portions of the housing 18 is a magnetic compass assembly 40. The magnetic compass assembly 40 includes a substantially rectangularly shaped plate 42 of clear or transparent plastic or synthetic resin which is secured to the upper surface of the straight edge 10 in the illustrated embodiment. The outer side edges 44 and 46 of the plastic plate 42 are aligned with side walls 48, 50, 52 and 54 of the opposed end portions of the housing 18. It will be noted in referring to FIG. 2 that the plate 42 has a thickness which is substantially less than the width of the several side walls 48–54. This construction permits a pencil 55 and the sight pins used in the device to be stored in one end portion of the housing 18 (as shown in dashed lines in FIG. 2) when the device is not in use.

The clear plastic plate 42 includes a pair of lines 56 and 58 marked thereon and superimposed over the opposed longitudinal edges 12 and 14 of the straight edge 10. The plastic plate 42 is further provided with a central line 60 which extends across the plate and is superimposed over the line 36 on the straight edge 10. An arrow indicia 62 is provided on this line and points in the direction of the sight pin 34 along the superimposed lines 36 and 60. The plate 42 defines a pin aperture 64 which detachably and frictionally receives a vertically extending sight pin 66 which is aligned with sight pin 34 along the lines 36 and 60.

It will be understood from the foregoing description that both of the sight pins 34 and 66 may be removed when the device is not in use, or may be quickly installed in their operative positions as shown in the drawings when magnetic bearings are to be taken.

The magnetic compass subassembly 40 further includes a compass housing or case 70 which is made of a non-magnetic rigid material, and which encloses within the housing, a pivotally supported magnetic needle 72. The magnetic needle 72 is supported upon a centrally apertured bearing element 74 which permits the needle to pivot in a bearing, and which encloses a circular aperture 75 in the center thereof. This aperture 75 is aligned with apertures 89, 90 and 91 which extend through the plate 42, straight edge 10 and bottom wall 28, respectively.

Magnetic compass bearings are indicated by indicia 76 carried on a movable ring 78 rotatably located around the outer periphery of the housing 70.

For the purpose of enabling the magnetic compass subassembly 40 to be protected from the elements when the device is not in use, and in order to permit a pencil and the sight pins 34 and 66 to be stored within one of the hollow open end portions of the housing 18, a pair of closure flaps 79 and 80 are pivotally connected through interconnecting intermediate folding panels 82 and 84 to the side edge portions of that part of the bottom wall 28 which underlies the magnetic compass subassembly 40. Thus, the flaps 79 and 80 may be folded up, along with the panels 82 and 84, to complete the overall rectangular parallelepiped configuration of the housing 18, with the compass subassembly 40 fully enclosed within and protected by the closed flaps. In order to permit the flaps to be secured in their closed positions, a snap engaging element which includes two parts 86 and 88 of conventional construction is provided on the flaps 79 and 80.

Operation

In the operation and use of the magnetic bearing plotting and sighting device of the invention, the flaps 79 and 80 are unsnapped from their folded, housing-closing position in which they enclose and protect the magnetic compass subassembly 40. After unsnapping the flaps 79 and 80 from each other by disengagement of the snap elements 86 and 88, these flaps are folded down to a flat position as illustrated in the figures of the drawing. In some instances where a large flat supporting surface for resting the device in a horizontal attitude is desirable, rigid relatively thin strap elements can then be inserted between the straight edge 10 and the bottom wall 28 of the housing 18 and across the upper surface of the flaps 78 and 80 so that they are maintained rigidly in their outwardly folded flat state in substantially monoplanar alignment to provide a large area surface at the lower side of the device for supporting it upon a post or other supporting element during sighting.

After the flaps 79 and 80 are folded out to the positions shown in FIG. 1, the sight pins 34 and 66 are removed from their stored position in the "pockets" constituted by the two opposed and longitudinally spaced end portions of the housing 18, and are pressed into their respective apertures 32 and 64. In this position, the sight pins 34 and 66 are aligned along a line of sight which coincides with the line 36 on the straight edge 10, and also with the line 60 on the transparent plate 42 of the magnetic compass subassembly 40. The device is now in its operative status preparatory to taking a line of sight from an observer using the device to a distant object, and for ascertaining the magnetic bearing of the object in relation to magnetic north.

It will be understood, of course, that magnetic direction is indicated in degrees, with the points of the compass being graduated from zero through 360 degrees. The magnetic bearing plotting and sighting device of the invention is set up with the straight edge 10 and bottom wall 28 of the housing 40 extending substantially horizontally. In doing this, the device may be rested upon any suitable available supporting structure or, in fact, may be hand held, although the latter procedure is not optimum. The distant object of which it is desired to take the magnetic bearing is then sighted, so that a line of sight passing through the sight pins 34 and 66 intersects the object.

When this alignment has been achieved, the rotatable ring 78 is rotated upon the housing 70 while holding the device stationary with the sight pins 34 and 66 aligned with the distant object until the north pole of the magnetized compass needle or pointer 72 is aligned with the 360° indicia indication on the rotatable ring 78. Alternatively, of course, the south pole of the magnetic needle or pointer can be aligned with the 180° reading on the rotatable ring 78. When this status of the magnetic compass is achieved by proper alignment of the rotatable ring 78 with the magnetic needle 72, the line 60 scribed on the upper surface of the clear synthetic resin plate 42 of the compass subassembly 40 will be aligned with a particular bearing reading on the outer ring 78 of the compass subassembly. This indicia reading on the ring 78 will be the magnetic bearing of the object which is being sighted along the aligned sight pins 34 and 66. A pencil may then be used to make note of this magnetic bearing in order to permit the location of the object in relation to the position of the observer to be set forth on a chart or map being made up.

After the line of sight and corresponding magnetic bearing have been obtained in the manner described, additional magnetic bearings of other objects may be taken, or only the single magnetic bearing may be of interest, and may be at that time affixed upon a map being drawn by the observer. In any event, after all sightings from the observer's location have been completed, the flaps 79 and 80 are again folded up to effect complete closure of the housing 18 and protection of the magnetic compass subassembly 40. This is accomplished, of course, after the sight pins 34 and 66 have been removed from their receiving apertures 32 and 64 and placed in their storage location inside one of the hollow end portions of the housing 18. The pencil 55 may or may not be stored at this time, depending upon whether the magnetic bearings obtained are then to be plotted on the map being made.

When the bearings are to be plotted on the map, and assuming that ranges or distances have also been obtained and are to be placed on the map according to a scale in use, the edge 12 of the straight edge device 10 can be employed for drawing the magnetic bearing on the map and the indicia along this edge of the straight edge can be used for scaling the range or distance to the object sighted.

It should be pointed out that the aperture or hole 75 formed through the bearing 74 of the magnetic needle 72 of the compass subassembly 40 has two functions. First, in some instances it will be desirable to anchor the device while swinging the outer end of the straight edge 10 into a position such that the distant object is in alignment with the sight pins 34 and 66. In this event, an elongated implement having a point on the end, such as the leg of the scribing compass, an ice pick, a pen knife or the like, can be projected through the aperture or hole 75 and into a wooden surface upon which the magnetic bearing plotting and sighting device is rested. The remainder of the device can then be swung about this anchoring point until the desired alignment of the sight pins 34 and 66 with the distant object is attained.

In another way of using the hole or aperture 75 in the bearing 74 of the compass needle 72, the same procedure can be followed when laying out a very large map. In this case, the pointed implement, such as the pointed leg of a scribing compass, is passed through the aperture or opening 75, and through that point on the map corresponding to the observation point from which the magnetic bearing is taken. The straight edge 10 is then swung or pivoted about this anchor point until the line 60 crosses the appropriate magnetic bearing on the outer ring 78 at a time when the compass needle is aligned with the north-south indicia on the outer ring. When this status is achieved, the aperture 32 which normally receives the sight pin 34 can be used for making a dot on the map by extending a pencil point through this aperture onto the map surface. The magnetic bearing plotting and sighting device can then be removed from the map surface, and a pencil line can be extended over any desired portion of the total line segment which lies between the pencil mark made by extension of the point of the pencil through the aperture 32 and the point made by the sharp implement extended through the aperture 75 into the surface of the map.

One of the important advantages of the device of the present invention is the ability to compactly house the compass subassembly and straight edge 10 for portability and for concurrent prevention of damage to the compass subassembly. When the flaps 79 and 80 are folded up to complete the rectangular parallelepiped overall configuration of the housing 18, the compass cannot be broken by bumping or contact with rocks or other elements, and the overall composite structure is flat and susceptible to slipping into the pocket of the observer, or if desired, hanging from the belt of the observer. The latter arrangement can be easily accomplished by slipping any type of suitable clip or flexible member through the aperture 32 and forming a loop therein for hanging the structure of the invention from the belt for transport purposes.

Although a preferred embodiment of the invention has been herein described in order to provide an example of the manner in which the basic principles of the invention can typically be embodied in physical form, various changes and innovations in the structure of the described preferred embodiment can be effected without departure from the basic principles of the invention. Changes and innovations of this type are therefore deemed to be circumscribed by the spirit and scope of the invention except as the same may be necessarily limited by the appended claims or reasonable equivalents thereof.

What is claimed is:

1. A device for taking and plotting magnetic bearings comprising:
    a flat, elongated straight edge element of right parallelepiped configuration having an elongated straight edge along one side thereof, and graduated indicia along said straight edge, said straight edge having an aperture therein for frictionally and removably receiving a sight pin extending vertically upwardly from the major plane of the straight edge element;
    a housing including a pair of spaced, opposed hollow portions each closed at one end by an end wall and interconnected by a bottom wall supporting said straight edge element, said end walls each having slots therein with said straight edge element extending through said slots;
    a magnetic compass subassembly mounted on said straight edge between said hollow portions of said housing and including:
    a transparent plate having indicia thereon facilitating alignment of two spaced points on said plate with said aperture in said straight edge element;
    a sight pin removably retained at one of said points and projecting from said transparent plate and normal to the major plane of said straight edge element; and
    a magnetic compass secured to said transparent plate and including a pivotally mounted compass needle supported for pivotation about an axis extending through the second point on said plate and normal to the major plane of said straight edge.

2. A device for taking and plotting magnetic bearings as defined in claim 1 and further characterized as including foldable flap means hingedly connected to said bottom wall and foldable to a position closing said magnetic compass subassembly.

3. A device for taking and plotting magnetic bearings as defined in claim 2 wherein each of said opposed hollow portions is of right parallelepiped configuration and is open at an end opposite the closed end thereof and facing the other of said hollow portions whereby sight pins can be stored in said hollow portions when said device is not in use.

4. A device for taking and plotting magnetic bearings as defined in claim 1 wherein said magnetic compass subassembly further includes indicia for visually portraying the magnetic bearing of a line of sight which includes said sight pin and a distant object.

5. A device for taking and plotting magnetic bearings as defined in claim 1 wherein said compass needle is supported for pivotation upon a centrally apertured bearing element aligned with underlying apertures in said bottom wall and straight edge.

6. A device for taking and plotting magnetic bearings as defined in claim 1 wherein said straight edge is a rectangularly configured ruler.

7. A device for taking and plotting magnetic bearings as defined in claim 3 wherein said magnetic compass subassembly further includes indicia for visually portraying the magnetic bearing of a line of sight which includes said sight pin and a distant object.

8. A device for taking and plotting magnetic bearings as defined in claim 7 wherein said compass needle is supported for pivotation upon a centrally apertured bearing element aligned with underlying apertures in said bottom wall and straight edge.

9. A magnetic direction indicating device comprising:
a housing including:
opposed spaced hollow end portions of rectangular parallelepiped configuration and including a common bottom wall in said end portions and extending between and interconnecting said end portions;
flap means foldably connected to said bottom wall between said end portions and foldable to a closure position for cooperation with said end portions to form a substantially closed housing;
a magnetic compass assembly supported over said bottom wall between said end portions and positioned to be exposed for usage in one position of said flap means, and to be enclosed in said housing when said flap means is folded to said closure position.

10. A magnetic direction indicating device as defined in claim 9 and further characterized as including means mounted on said housing for establishing a line of sight extending centrally through said magnetic compass assembly.

11. A magnetic direction indicating device as defined in claim 10 wherein said line of sight means includes:
a straight edge; and
graduated indicia forming a linear scale along said straight edge.

* * * * *